US010331083B1

United States Patent
Ness et al.

(10) Patent No.: US 10,331,083 B1
(45) Date of Patent: Jun. 25, 2019

(54) WATCH BAND WITH OPTICAL SENSOR

(71) Applicant: Apple Inc., Cupertino, CA (US)

(72) Inventors: Trevor J. Ness, Santa Cruz, CA (US); Michael B. Wittenberg, Sunnyvale, CA (US); Elizabeth B. Diaz, Woodside, CA (US)

(73) Assignee: APPLE INC., Cupertino, CA (US)

( * ) Notice: Subject to any disclaimer, the term of this patent is extended or adjusted under 35 U.S.C. 154(b) by 306 days.

(21) Appl. No.: 15/268,531

(22) Filed: Sep. 16, 2016

(51) Int. Cl.
| | |
|---|---|
| *G04B 47/06* | (2006.01) |
| *H04N 5/247* | (2006.01) |
| *H04N 5/225* | (2006.01) |
| *G04B 37/14* | (2006.01) |

(52) U.S. Cl.
CPC ......... *G04B 47/06* (2013.01); *G04B 37/1486* (2013.01); *H04N 5/2252* (2013.01); *H04N 5/2257* (2013.01); *H04N 5/247* (2013.01)

(58) Field of Classification Search
CPC .... G04B 47/06; G04B 37/1486; H04N 5/247; H04N 5/2257; H04N 5/2252
See application file for complete search history.

(56) References Cited

U.S. PATENT DOCUMENTS

| 8,994,827 | B2 | 3/2015 | Mistry et al. | |
|---|---|---|---|---|
| 9,191,482 | B1 | 11/2015 | Sidbury | |
| 2002/0068600 | A1* | 6/2002 | Chihara | H04B 1/385 |
| | | | | 455/557 |
| 2008/0081968 | A1* | 4/2008 | Numada | A61B 5/02007 |
| | | | | 600/322 |
| 2009/0162043 | A1* | 6/2009 | Chou | G03B 17/40 |
| | | | | 396/56 |
| 2014/0362544 | A1 | 12/2014 | Han et al. | |
| 2015/0003210 | A1 | 1/2015 | Joung et al. | |
| 2015/0172538 | A1* | 6/2015 | Nordstrom | H04N 5/2252 |
| | | | | 348/207.1 |
| 2015/0241916 | A1 | 8/2015 | Choi et al. | |
| 2016/0283809 | A1* | 9/2016 | Rice | A45F 5/00 |
| 2016/0291550 | A1* | 10/2016 | Chen | H02J 50/10 |

* cited by examiner

*Primary Examiner* — Ahmed A Berhan
(74) *Attorney, Agent, or Firm* — Morgan, Lewis & Bockius LLP

(57) ABSTRACT

A camera optical sensor is disposed at a distal end portion of a camera watch band that attaches a watch body to a user's wrist. The camera watch band is configured to be coupled to at least one side of the watch body, and the camera watch band includes an optical sensor or camera, and an operable connection to transfer data between the optical sensor and the display or other device. The band is flexible and may be manipulated by a user to aim an optical sensor disposed at the distal end portion of the camera watch band separately from the watch body. The display or other device functions as the viewfinder for the optical sensor.

20 Claims, 11 Drawing Sheets

WATCH BAND WITH OPTICAL SENSOR

FIELD

The described embodiments relate generally to a wearable device. More particularly, the present embodiments relate to a watch band for a wristwatch or other wrist-mounted device (e.g., a smartwatch).

BACKGROUND

Recent advances in smartwatches have enabled users to do increasingly more on a watch as opposed to a smart phone.

SUMMARY

The present disclosure details apparatuses related to wearable devices that capture images and video. A potential barrier to smartwatch adoption is their minimal image-capturing ability. Some embodiments described herein include a smartwatch with the functionality of a camera that is independently positionable relative to a watch body. This can allow the smartwatch to capture images and video at angles and orientations that do not depend directly on the angle and orientation of the rest of the smartwatch, including the watch body. Such functionality can replace or at least meaningfully augment a user's existing camera or camera-enabled device (e.g., smartphone, tablet). Such a wearable device that captures images and video may do so via an optical lens integrated into a distal end portion of a watch band that retains the device on a user's wrist. Embodiments may include a camera watch band that is capable of connecting directly to one side of the watch body (which may include a display), an optical sensor attached to or integrated within the distal end portion of the camera watch band opposite its connection to the watch body, and a data connection between the optical sensor and the watch body or other device.

The camera watch band may be capable of attaching a smartwatch to a user's wrist, and an extension portion of the band (i.e., a portion of the band that is not used to connect the smartwatch to the user's wrist) may house an optical sensor. The extension portion of the camera watch band may be flexible such that it can be manipulated by a user (e.g., by bending or twisting) to aim the optical sensor. The optical sensor may be housed in a distal end portion of the camera watch band. In some embodiments, the extension portion of the camera watch band may maintain its form after being manipulated and released by a user, to maintain a user-set camera orientation relative to the rest of the smartwatch. To help maintain its form, the flexible camera watch band may include a malleable metal core, a core of magnetorhelogical fluid, mechanical links, or any combination of these features. In some embodiments, the optical sensor may be disposed in a rigid housing within the distal end portion of the camera watch band. Alternatively, the optical sensor may removably mount to the watch body to secure the optical sensor in a closer fixed position relative to the watch body.

A display screen of the watch body or other device may act as a viewfinder for the optical sensor. The optical sensor may transfer data to the watch body or other device though a conducted electrical path or a wireless connection, for example.

The optical sensor may capture images or video when the user takes an affirmative action such as pinching the camera watch band, giving a verbal command, pressing a button on the distal end portion of the camera watch band, or pressing a button on the case (e.g., on the screen of the display, which may include a graphical input on a touchscreen of the display).

In some embodiments, a second optical sensor is coupled to the opposing side of the camera watch band to which the first optical sensor is coupled. The user may quickly switch between optical sensors or capture images or video from either optical sensor or from both optical sensors at the same time.

In some embodiments, the optical sensor is coupled to the camera watch band by a rotatable hinge, allowing the optical sensor to be rotated at the end of the camera watch band.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
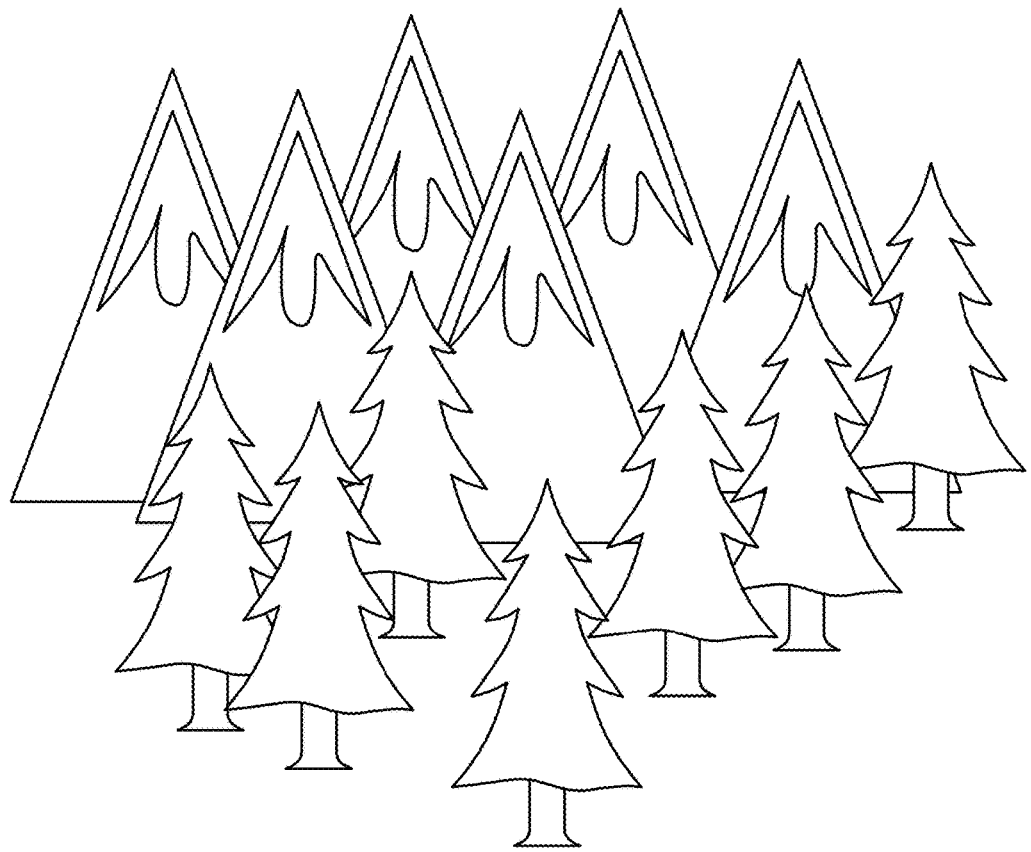
FIG. 1 shows a watch with a camera watch band being used in an example environment.
Figure 1:
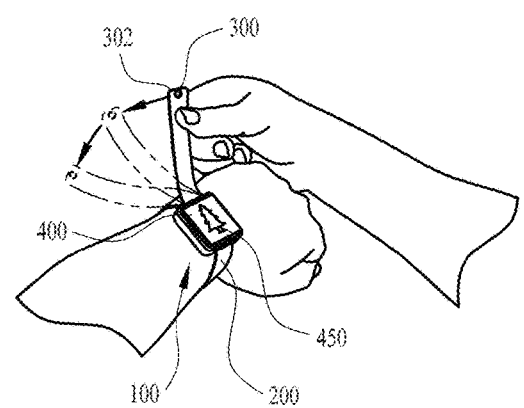

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

A smartwatch that has the capability of capturing images and video may provide an opportunity for users to be more reliant on their smartwatch and less reliant on other devices (e.g., smartphones, tablets, digital cameras) to capture images or videos. Thus, a smartwatch with the capability of capturing images or videos may enable a user to forego carrying a smartphone when doing some activities, especially activities or environments where it would be difficult to take a smartphone (e.g., hiking, running, swimming, surfing, snowboarding, and any number of other situations). Additionally, a smartwatch with the capability of capturing images may enable a user to capture images that would not be conveniently captured with a smartphone. However, a smartwatch with a camera rigidly mounted to a watch body or rigidly mounted to a watch band strapped around a user's wrist may force a user into uncomfortable and awkward positions to angle the camera's optical sensor or lens to capture a desired image or video. A user's arm may also become fatigued when trying to record a video from the smartwatch's rigidly mounted camera if the user's arm must be held in such a position for a significant amount of time to record the video. Additionally, by angling the smartwatch to aim its optical sensor, a user may be unable to see an image or video displayed on the smartwatch's display screen in the moment of capture in situations where the user must awkwardly aim the watch body at the desired target.

Thus, to address these difficulties and to improve the user's experience, some of the embodiments described herein provide for a smartwatch that has a camera that may be conveniently positioned or manipulated by the user independent of the position of the rest of a smartwatch, such as the position of the watch body or display screen. The user may capture images or video with the camera without having to move their arm into an awkward position. The smartwatch may display a real-time field of view of the camera to the user on a display screen, may display images or video to the user at the moment of capture, or may simply store the images or video for the user to observe at a later time.

Some embodiments include a camera watch band that may include an optical sensor disposed near a distal end portion of the camera watch band. The optical sensor may send image data to a watch body to which a proximal end of the camera watch band is attached. The image data may be displayed on the display of the watch body. Camera watch bands as described herein may alternatively or additionally be attached to other devices, such as, for example, analog watches, activity trackers, diagnostics sensors, and the like. Further, the camera watch band may be used to attach the smartwatch to a user in a location other than the user's wrist, such as, for example, the user's ankle, shoulder, clothing, or backpack.

These and other embodiments are discussed below with reference to the figures. However, those skilled in the art will readily appreciate that the detailed description given herein with respect to these figures is for explanatory purposes only and should not be construed as limiting.

FIG. 1 illustrates a wearable device 100 according to some embodiments. Wearable device 100 may be a watch (e.g., a smartwatch). Wearable device 100 includes a camera watch band 200 with an optical sensor 300 arranged to receive optical input through a camera lens 302, and a watch body 400 with a display 450. The camera lens may be a normal lens, wide-angle lens, long-focus lens, macro lens, zoom lens, apochromatic lens, fisheye lens, stereoscopic lens, soft-focus lens, or any other suitable camera lens. Camera watch band 200 attaches and secures wearable device 100 to the user's wrist or other appendage. Optical sensor 300 may be located at a distal end portion of camera watch band 200, enabling a user to position or manipulate the distal end portion of camera watch band 200 and simultaneously manipulate a field of view of optical sensor 300. The movement of optical sensor 300 may be independent of the movement of watch body 400, due to flexibility of camera watch band 200 leading up to its distal end portion. Accordingly, the user may position the field of view of optical sensor 300 to capture desired images or video. For example, FIG. 1 illustrates the user capturing an image or video of a nature scene.

Figure 2:
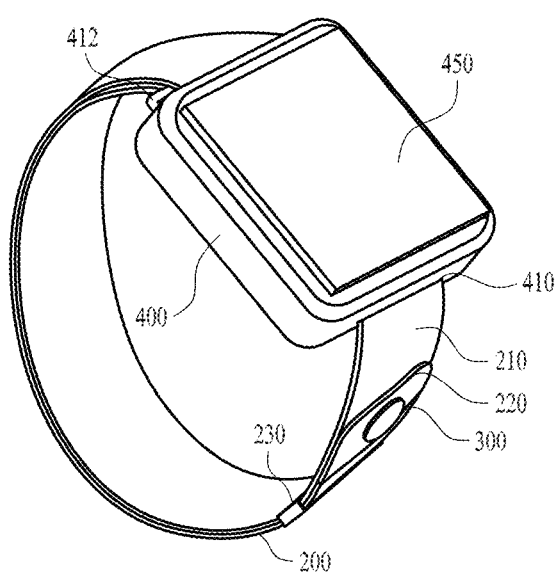
FIG. 2 shows a perspective view of a watch with a camera watch band with its camera stowed.

As shown in FIG. 2, in some embodiments a proximal end 210 of camera watch band 200 couples to one side of watch body 400 at a connection 410. Camera watch band 200 then couples to a connection 412 forming a loop around a user's wrist to attach and secure wearable device 100 to the user. A distal end portion 220 of camera watch band 200 may be attached to another part of camera watch band 200 (e.g., at anchor 230) to secure distal end portion 220 in a stowed position when optical sensor 300 is not deployed. Distal end portion 220 of camera watch band 200 is not directly secured to watch body 400; it is a free tail end of camera watch band 200.

Camera watch band 200 may be coupled to one side of watch body 400 at connection 410 by magnets, a buckle, a latch, a hinge, a snap, or other mechanical interlock or attachment mechanism. Connection 412 may be at an opposite side of watch body 400 as connection 410. Connection 412 may secure camera watch band 200 so that the length of camera watch band 200 is constrained between connection 410 and connection 412 once camera watch band 200 has been connected to connection 412 by the user. In this way even while or after the user is manipulating optical sensor 300, wearable device 100 remains secured to the user's wrist. Connection 412 may be, for example, a friction-fit pass-through, a buckle, a latch, a snap, a hook-and-loop fastener or other mechanical interlock or attachment mechanism. Through its connections at 410 and 412, camera watch band 200 may secure wearable device 100 around a wearer's wrist or other appendage without loosening regardless of the motion of distal end portion 220 and optical sensor 300.

Distal end portion 220 may be removably attached to anchor 230 by, for example, magnets, buckles, latches, snaps, or other mechanical interlock or attachment mechanism. In some embodiments, anchor 230 is not a separate component, but a location along camera watch band 200 (which may be one of multiple such locations) to which distal end portion 220 may be attached.

Figure 3:
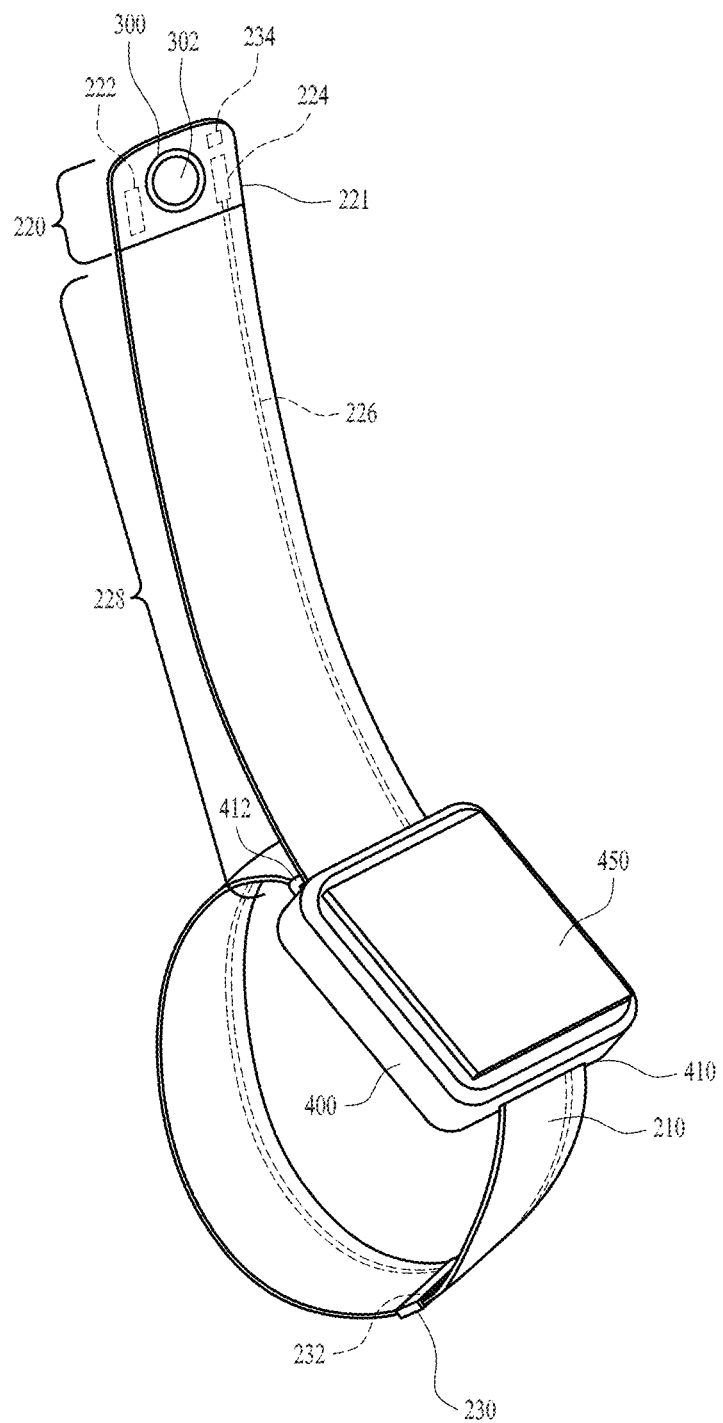
FIG. 3 shows a perspective view of a watch with a camera watch band with its camera deployed.

FIG. 3 illustrates distal end portion 220 of camera watch band 200 removed from anchor 230, such that camera watch band 200 and optical sensor 300 are in a deployed position. The user may remove distal end portion 220 of camera watch band 200 from anchor 230 when the user desires to use optical sensor 300 to capture imagery. A free portion of camera watch band 200 that is not used to attach watch body 400 to the user's wrist may form an extension portion 228. Extension portion 228 extends between connection 412 and distal end portion 220. Optical sensor 300 is disposed at distal end portion 220 of camera watch band 200. For example, distal end portion 220 may extend from the distal end of camera watch band 200 by at least a distance equal to a diameter of optical sensor 300 (e.g., by twice the diameter of optical sensor 300). This distance may be less than 2 inches (e.g., 1 inch or ½ inch). Optical sensor 300, which is disposed within distal end portion 220, may be positioned a distance from the distal end of camera watch band 200 equal to less than the diameter of optical sensor 300 (e.g., less than half the diameter of optical sensor 300). This distance may be less than 1 inch from the distal end of camera watch band 200).

Camera watch band 200 may be constructed of a flexible material. Thus, the user may manipulate optical sensor 300 at distal end portion 220 to capture images or video by positioning and pointing optical sensor 300 at a desired object. Since camera watch band 200 is flexible, extension portion 228 of camera watch band 200 may bend and twist in response to the user's movement of optical sensor 300 at distal end portion 220. Extension portion 228 of camera watch band 200 may be manipulated relative to watch body 400 in a variety of different directions due to the flexibility of camera watch band 200. In this way, optical sensor 300 has a substantially free range of motion relative to watch body 400. For example, optical sensor 300 may be moved further from or closer to watch body 400, be rotated around watch body 400 (e.g., with connection 412 acting as an axis of rotation, to raise or lower the position of optical sensor 300 relative to watch body 400), be twisted (e.g., to turn the optical sensor 300 left or right relative to watch body 400), or be moved in any combinations of these ways. Though the movement of extension portion 228 is independent of the movement of watch body 400, the field of view may be changed by movement of both watch body 400 and extension portion 228. For example, the user may move their arm or wrist left to right and up and down in addition to moving optical sensor 300 to change the field of view of optical sensor 300.

Camera watch band 200 may further include a processor 224 disposed therein (e.g., within distal end portion 220). Processor 224 may process images or video captured by optical sensor 300 before they are transferred to watch body 400 (and display 450) or another device. Processor 224 may transfer images or video to watch body 400 through a conducted electrical path 226. Conducted electrical path 226 may be made from, for example, copper, gold, silver, conductive polymers, plasmas, or other suitable materials. Processor 224 may enable image processing to be performed at distal end portion 220 rather than at watch body 400, which may facilitate faster image processing or fewer requirements for watch body 400.

Camera watch band 200 may further include a battery 222 disposed therein (e.g., within distal end portion 220). One or more optical sensors 300 and processors 224 may be powered by battery 222. In some embodiments battery 222 may supplement power provided to optical sensor 300 and processor 224 by another battery of wearable device 100 (e.g., via conducted electrical path 226). This may help minimize power draw on other batteries of wearable device 100 and lengthen the overall battery life of wearable device 100.

Optical sensor 300, processor 224, and battery 222 may be housed in an optical sensor housing 221 of camera watch band 200. Optical sensor housing 221 may be integrally connected to the rest of camera watch band 200. Alternatively, optical sensor housing 221 may be removably connected to the rest of camera watch band by adhesive, magnets, buckles, latches, a hinge, a snap, or other mechanical interlock or attachment mechanisms. In such embodiments, optical sensor housing 221 may be removed from the rest of camera watch band 200 to allow the user the preference of taking optical sensor 300 on a desired outing or trip. Optical sensor housing 221 may be formed of a rigid material such as acrylonitrile butadiene styrene, aluminum, stainless steel, low-density polyethylene, or other suitable material. Such rigidity may help protect the electronic components within optical sensor housing 221 as well in assist in helping the user obtain a steady field of view when aiming optical sensor 300 at a desired object.

Display 450 of watch body 400 may function as a viewfinder for optical sensor 300. In other words, display 450 may display images sensed or captured by optical sensor 300 in real time. The user may manipulate optical sensor 300 separately from watch body 400 and display 450 as described above. Accordingly, the user may hold display 450 in one position relative to the user while the user manipulates optical sensor 300. This may allow the user to conveniently concentrate on the stably-positioned viewfinder of display 450 rather than on the moving optical sensor 300.

The viewfinder of display 450 or a camera application of wearable device 100 may automatically activate when distal end portion 220 of camera watch band 200 is removed from a stowed position, e.g., when distal end portion 220 of camera watch band 200 is removed from anchor 230. Camera watch band 200 (or anchor 230) may include a sensor 234 (or 232) to detect when distal end portion 220 is removed from anchor 230 and send a signal to wearable device 100 to activate the viewfinder of display 450. Alternatively, the viewfinder of display 450 may automatically activate when the user begins to manipulate distal end portion 220. For example, sensor 234 of distal end portion 220 may include an accelerometer to detect movement of distal end portion 220, or processor 224 of distal end portion 220 may detect movement in imagery sensed by optical sensor 300 that is independent of movement of watch body 400 (e.g., sensed by components of watch body 400 itself), thereby indicating that distal end portion 220 is being moved relative to watch body 400. Accordingly, when sensor 234 (or processor 224) detects movement of distal end portion 220, a signal may be sent to wearable device 100 to activate the viewfinder of display 450.

Figure 4:
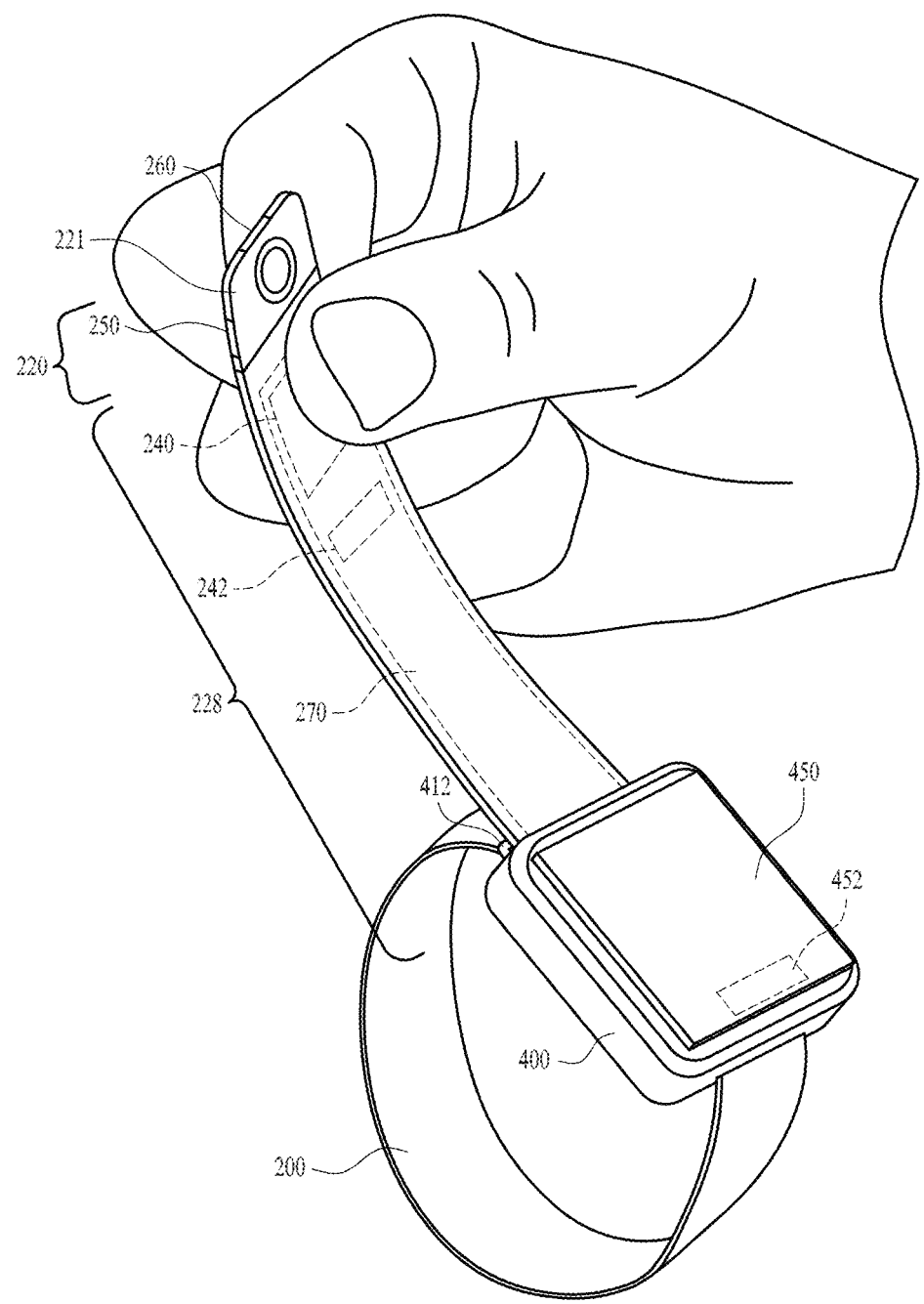
FIG. 4 shows a perspective view of a watch with a camera watch band being handled by a user.

Camera watch band 200 or a portion thereof may have malleable properties, in that it can be bent and manipulated upon the application of sufficient force, and it will remain in its last position relative to watch body 400 (and display 450) after the force is removed and in the absence of further manipulation. In other words, it can be bent out of shape without a tendency to return to its previous shape or to change shape under force of gravity. This can help enable one-handed operation of camera watch band 200, since a user can manipulate optical sensor 300 into a desired position relative to watch body 400, and upon releasing camera watch band 200, optical sensor 300 will maintain its relative position. This can enable the user to then aim optical sensor 300 using the arm upon which wearable device 100 is mounted, without continuing to hold optical sensor 300. FIG. 4 illustrates camera watch band 200 with a malleable core 270 (e.g., a malleable metal core 270) forming a portion of camera watch band 200 (e.g., embedded within camera watch band 200).

Core 270 may be made of, for example, gold, copper, platinum, aluminum, or other metal or alloy. Thus, camera watch band 200 may be manipulated into a desired shape, and the user may capture images with optical sensor 300 in a fixed position relative to the user's appendage to which camera watch band 200 is attached.

Alternatively, core 270 may be formed of magnetorheological fluid. In such embodiments wearable device 100 may selectively apply a magnetic field to core 270 in order to increase core's 270 viscosity such that core 270 becomes a viscoelastic solid. For example, the user may position camera watch band 200 into a desired position while core 270 is not subject to a magnetic field, and is therefore flexible. The user may then subject core 270 to a magnetic field (e.g., by selecting appropriate controls of wearable device 100), resulting in camera watch band 200 becoming rigid. The magnetic field may be activated from watch body 400, camera watch band 200, or from another device. The magnetic field may be activated by the use of a verbal command, a pressure sensor, a button, an electrical contact, or any other suitable manner. The user may then capture images or video with optical sensor 300 fixed in a rigid position in relation to watch body 400 to which camera watch band 200 is attached.

Further, FIG. 4 illustrates the various ways by which to actuate optical sensor 300 to capture images or video. For example, a pinch actuator 240 may be coupled to or integrated into extension portion 228 (or optical sensor housing 221) of camera watch band 200. The user may aim optical sensor 300 at a desired target by holding and manipulating distal end portion 220 and may actuate optical sensor 300 to capture images or video by pinching pinch actuator 240. Pinch actuator 240 may be a pressure sensor, a button, an electrical contact, or other similar mechanism. By the integration of pinch actuator 240 into extension portion 228 (or optical sensor housing 221), a user may single-handedly aim and actuate optical sensor 300.

Optical sensor 300 may capture images or video in response to verbal commands. For example, a sound sensor 242 may be coupled to or integrated into camera watch band 200 or sound sensor 242 may be disposed in watch body 400. Accordingly, the user may aim optical sensor 300 at a desired target by holding distal end portion 220 and actuating optical sensor 300 by speaking "capture," "take photo," "take video" or any number of verbal commands. Sound sensor 242 may be a microphone or any other device capable of sensing vibration through a medium (e.g., audible sound through air or water).

Optical sensor 300 may capture images or video in response to actuation of a button located on watch body 400. For example, a screen button 452 may be present on display 450 (e.g. graphical input through a touchscreen of display 450). Thus, the user may aim optical sensor 300 at a desired target by manipulating extension portion 228 and optical sensor 300 may capture images or video in response to actuation of screen button 452 on display 450. Display 450 may be a resistive touchscreen panel, a capacitive touch screen panel, an infrared touchscreen, or any other similar panel or screen capable of displaying images (and, in some embodiments, capable of accepting touch input).

Optical sensor 300 may capture images or video in response to actuation of a button located on distal end portion 220 of camera watch band 200. For example, a side button 250 or a top button 260 may be coupled to distal end portion 220 and pressing side button 250 or top button 260 may actuate optical sensor 300. Thus, the user may aim optical sensor 300 at a desired target by holding distal end portion 220 and optical sensor 300 may capture images or video in response to actuation of side button 250 or top button 260. Side button 250 or top button 260 may be a push button, a slide switch, a toggle switch, a capacitive touch button, or any other similar device or mechanism.

Figure 5:
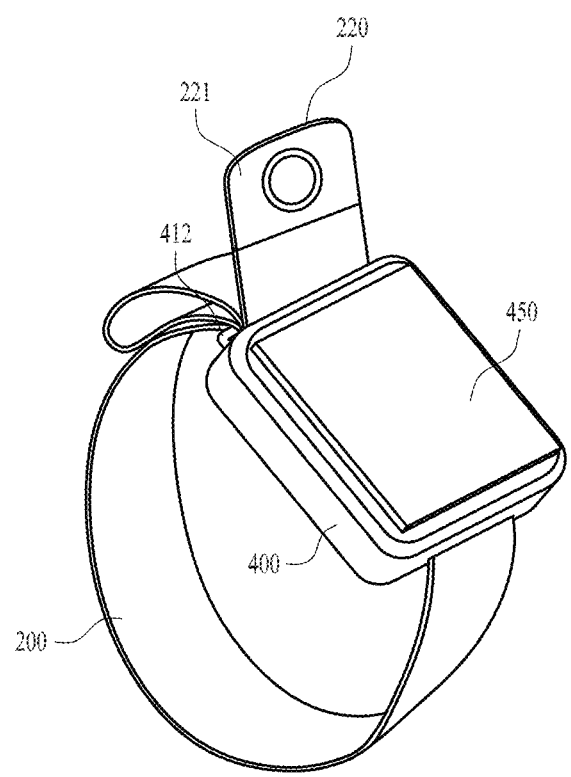
FIG. 5 shows a perspective view of a watch with a camera watch band where the camera is in a closely deployed state.
Figure 6:
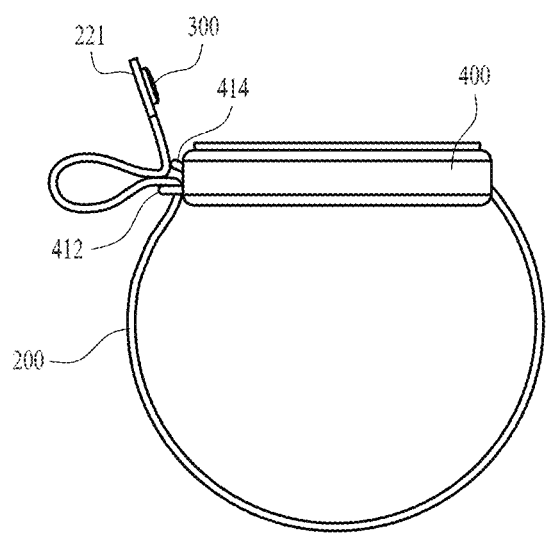
FIG. 6 shows side view of a watch with a camera watch band where the camera is in a closely deployed state.

FIGS. 5 and 6 illustrate optical sensor housing 221 may be closely deployed to watch body 400 (i.e., fixed relative to watch body 400 in the absence of an outside force applied to camera watch band 200), so that optical sensor 300 disposed at distal end portion 220 moves more directly in relation to the user's wrist and arm movements. Optical sensor housing 221 may removably mount to a connection 414 along an intermediate point between connection 412 and distal end portion 220 to secure optical sensor 300 in a closer fixed position relative to connection 412. Distal end portion 220 of camera watch band 200 may be rigidly held in place by connection 414 through the use of magnets, buckles, latches, hinges, snaps, hook-and-loop fasteners, or other mechanical interlock or attachment mechanism. In this manner, the user can easily position distal end portion 220 in close relation to the viewfinder of display 450 to more directly aim optical sensor 300 at a desired target. The user may simply adjust their wrist to a desired position as optical sensor 300 moves relative to the user's wrist movements. This may be beneficial if the user wants to use optical sensor 300 to capture images or video of themselves without optical sensor 300 being far removed from the user's wrist.

Figure 7:
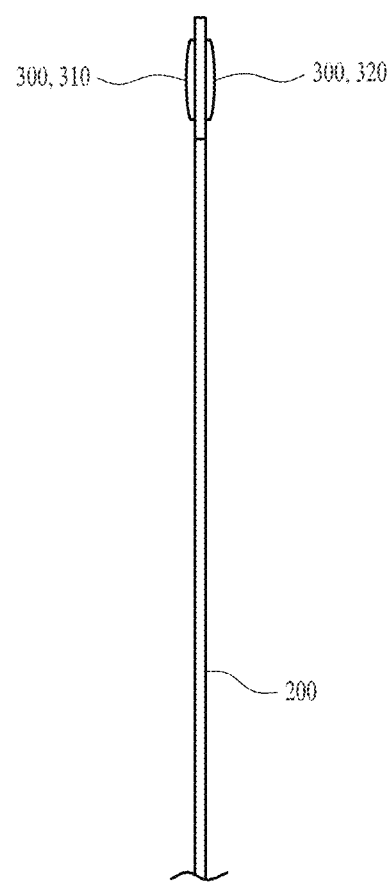
FIG. 7 shows a side view of a camera watch band with two optical sensors.

FIG. 7 illustrates camera watch band 200 with two optical sensors, a first optical sensor 310 and a second optical sensor 320, both disposed near the distal end portion 220. Second optical sensor 320 may be coupled to an opposing side of distal end portion 220 to which first optical sensor 310 is coupled such that first optical sensor 310 and second optical sensor 320 have opposing optical directions. This arrangement may enable the user to point first optical sensor 310 at themselves and point second optical sensor 320 away from the user, or to point optical sensors 310 and 320 in any other pair of opposing directions.

First optical sensor 310 and second optical sensor 320 may be manipulated and actuated in any of the same manners as has been described elsewhere herein. They may be used independently of each other or first optical sensor 310 and second optical sensor 320 may be used at the same time. For example, if the desired subject of an image is in front of the user, the user may capture the image or video using first optical sensor 310. If the desired subject of an image is the user themselves or something behind the user, the user may capture the image or video using second optical sensor 320. If the user wishes to capture imagery in both directions at once, the user may simultaneously activate the image-capturing function of both first optical sensor 310 and second optical sensor 320. For example, the user may wish to simultaneously capture an image or video of the user's reaction on second optical sensor 320 to the image or video captured on first optical sensor 300.

Figure 8:
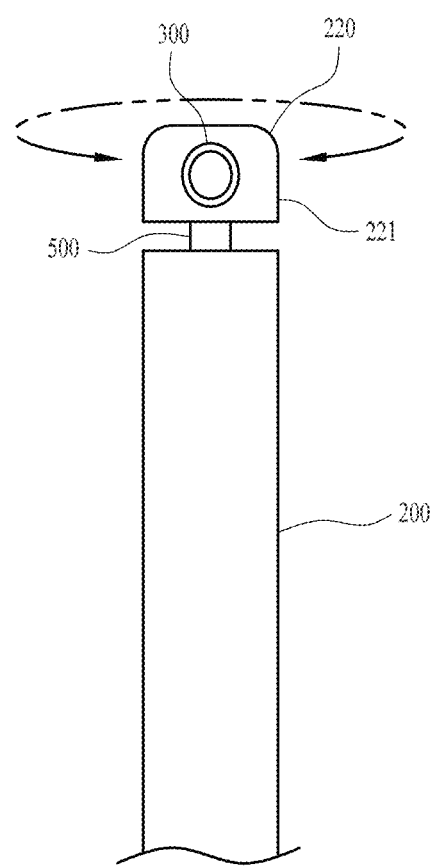
FIG. 8 shows a side view of a camera watch band with a rotatable hinge.

FIG. 8 illustrates optical sensor housing 221 coupled to camera watch band 200 by a rotatable connection 500. Rotatable connection 500 may be a gimbal, mechanical hinge (e.g., a pin hinge, a ball hinge, or a ball joint), or other similar device. Due to rotatable connection 500, the user may rotate optical sensor 300 at least 180 degrees (e.g., up to 360 degrees) relative to its attachment at distal end portion 220 to enable the user to capture images or video at a variety of different angles. This can enable a user to capture imagery in opposite directions using optical sensor 300, even without manipulating extension portion 228 (e.g., while extension portion 228 remains in a fixed position). As shown in FIG. 8, rotatable connection 500 may have an axis of rotation extending in a length direction relative to extension portion 228.

In some embodiments, rotatable connection 500 may have preset orientations to add additional stability and repeatability to optical sensor 300. Such preset orientations may correspond to detents or other irregularity in rotating distal end portion 220 such that a user can feel a greater resistance to turning distal end portion 220 at the preset orientations. In some embodiments, the preset orientations may enable the user quickly to position optical sensor 300 toward the user, and subsequently rotate optical sensor 300 180 degrees to capture objects or scenery away from the user. Providing for the rotation of optical sensor 300, or providing opposing cameras on both sides of distal end portion 220 will reduce the tendency for a user to severely twist camera watch band 200 to obtain a desired optical sensor 300 orientation. This can help maintain the integrity of camera watch band 200 and its internal components, by reducing the degree of stress that may be applied to them by manipulation of camera watch band 200.

Figure 9:
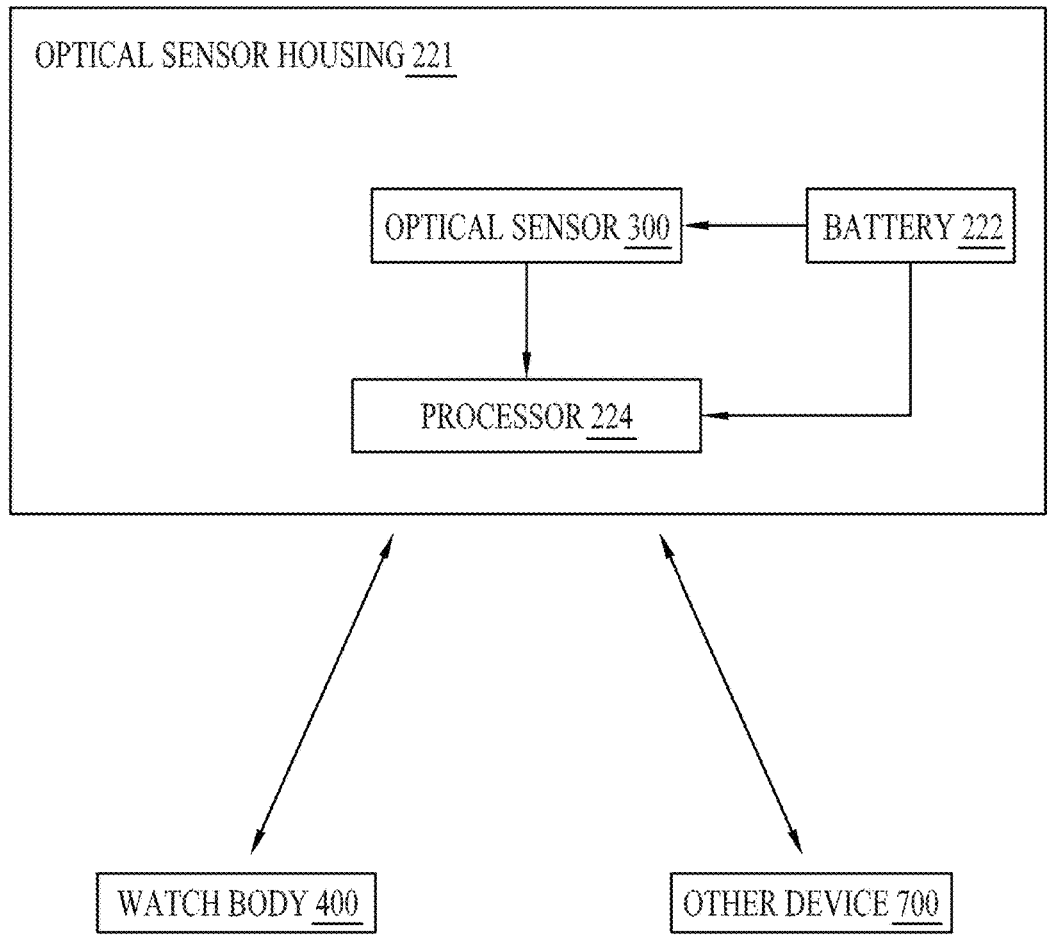
FIG. 9 shows a block diagram of a camera watch band system.

FIG. 9 is a block diagram illustrating data transfer for optical sensor 300. Data may be transferred from optical sensor 300 or processor 224 to watch body 400 or other device 700 (e.g., smartphone, tablet, laptop, etc.). In some embodiments, data may be transferred through a conducted electrical path 226 (see, e.g., FIG. 3) in camera watch band 200.

Data may be transferred from optical sensor 300 or processor 224 to watch body 400 or other device 700 (e.g., smartphone, tablet, laptop, etc.) through a wireless connection. The wireless connection may be, for example, radio, sonic, electromagnetic induction, free-space optical or other wireless protocol.

Data may be transferred from optical sensor 300 or processor 224 to watch body 400 or other device 700 through an optical connection. The optical connection may be, for example, via a wireless light emission and photo sensor combination or by a wired optical fiber connection.

Figure 10:
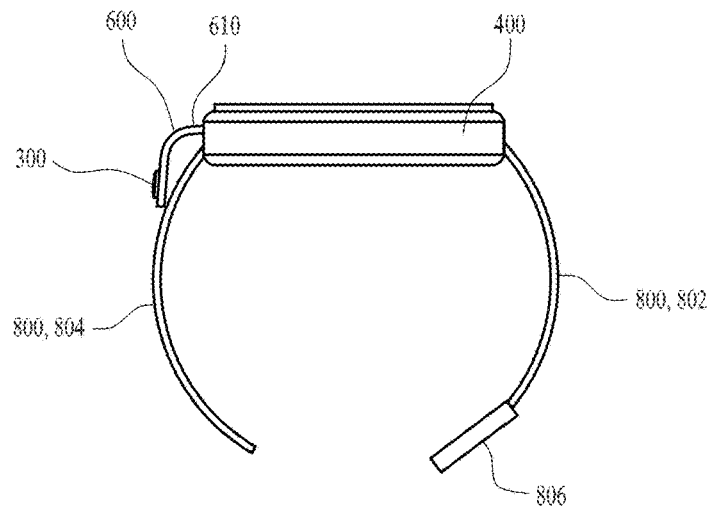
FIG. 10 shows a side view of a watch with an auxiliary camera band coupled to one side of a watch body.
Figure 11:
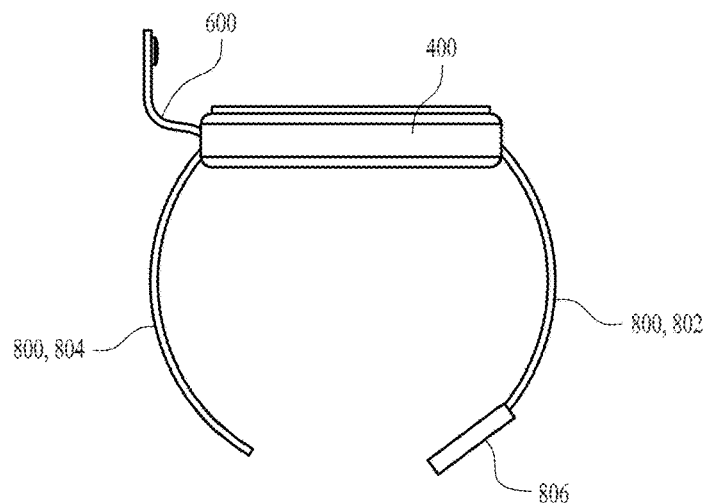
FIG. 11 shows a side view of the watch of FIG. 10 with the auxiliary camera band in a different position.

FIGS. 10 and 11 illustrate wearable device 100 with a watch band 800 with a first band portion 802 and a second band portion 804, according to some embodiments. First band portion 802 and second band portion 804 interconnect via a band fastener 806 to attach and secure wearable device 100 to the user's wrist. Wearable device 100 further includes an auxiliary band 600 with optical sensor 300 disposed within auxiliary band 600, rather than within watch band 800. Auxiliary band 600 may be removably coupled to watch body 400 and may be entirely separate from watch band 800 that attaches watch body 400 to the user's wrist. Optical sensor 300 of auxiliary band 600 may communicate with watch body 400 wirelessly, by a wired connection, or optically. Auxiliary band 600 have any and all of the same functionalities and features as described above with respect to camera watch band 200, in any combination. For example, auxiliary band 600 may be flexible and/or malleable in the same way as described above for camera watch band 200, which may enable the user to manipulate auxiliary band 600 to capture images and video in the same way. Alternatively, auxiliary band 600 may be rigid and rotate about a hinge with an axis of rotation at the attachment 610 of auxiliary band 600 to watch body 400. In some embodiments auxiliary band 600 may have rotatable connection 500 or two optical sensors 310, 320 on opposing side of auxiliary band 600, as discussed above with respect to camera watch band 200. In this manner, the user may have a traditional watch band but still maintain the functionality and features of camera watch band 200 discussed previously.

Auxiliary band 600 may be removed from wearable device 100 by being attached to watch body 400 via a removable connection, such as of magnets, buckles, latches, hinges, snaps, hook-and-loop fasteners, or other mechanical interlock or attachment mechanism. In this way, a user may selectively bring optical sensor 300 along, based on the user's preference (e.g., if the user does not expect to want to capture imagery at an upcoming event, the user may remove or not attach auxiliary band 600). The user may use an alternative watch band 800 to attach watch body 400 to the user's wrist, but selectively maintain the function of optical sensor 300. In some embodiments, when optical sensor 300 is not in use, auxiliary band 600 may be stowed by attaching to another portion of wearable device 100 (e.g., another band of wearable device 100) by magnets, buckles, latches, snaps or other mechanical interlock or attachment mechanism.

Figure 12:
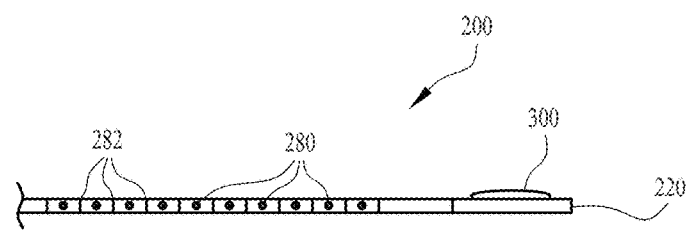
FIG. 12 shows a side view of a camera watch band comprised of mechanical links.

FIG. 12 illustrates a camera watch band 200 or a portion thereof fabricated from a series of mechanical links 280 with pivot points between mechanical links 280 to allow flexibility for a user to manipulate camera watch band 200. Such mechanical links 280 may be attached to each other by hinges 282 to provide flexibility to camera watch band 200. For example, hinges 282 may be friction hinges, which may allow relative motion between adjacent mechanical links 280 upon the application of sufficient force such as would be applied by a user manipulating camera watch band 200, and may retain adjacent mechanical links 280 in position relative to each other when such force is no longer applied. Such hinges 282 may be pinned hinges (with an axis of rotation) or ball hinges (with a point of rotation).

Figure 13:
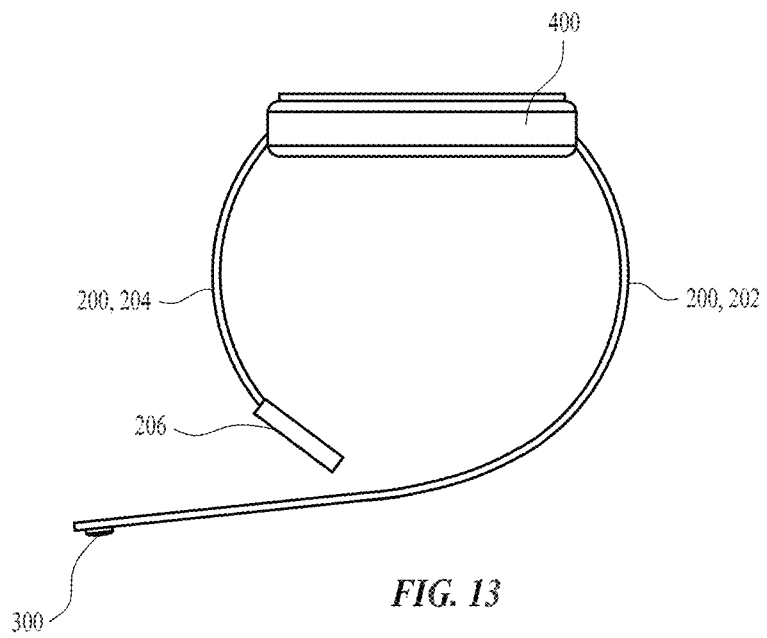
FIG. 13 shows a side view of a watch with a camera watch band with two band portions.
Figure 14:
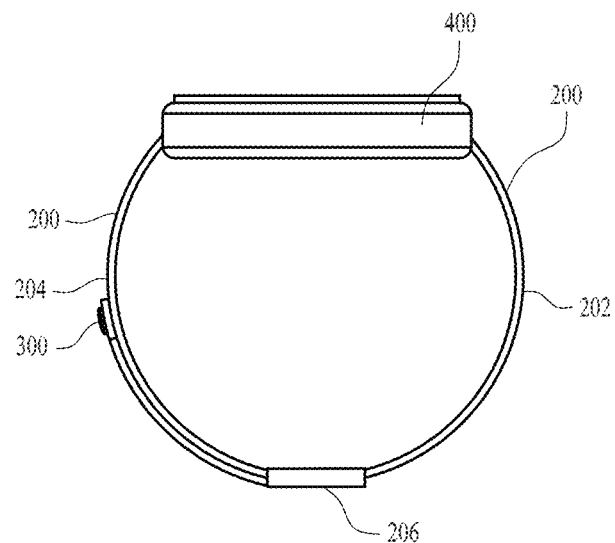
FIG. 14 shows a side view of the watch of FIG. 13 with the two band portions connected.

FIGS. 13 and 14 illustrate wearable device 100 with camera watch band 200 that includes first band portion 202 and second band portion 204. Band fastener 206 is coupled to second band portion 204, thus, the user may attach wearable device 100 to the user's wrist by pulling first band portion 202 through band fastener 206. First band portion 202 may include optical sensor 300 disposed within distal end portion 220, which may be used in a similar manner as outlined in previous embodiments.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein. For example, embodiments described herein have been described with reference to a watch band, but the features of the band described are not limited to use with a watch. The bands may be used independently of any device (e.g., attached to clothing or backpacks), or may be used with devices other than watches, such as, for example, smartphones (e.g., bands according to some embodiments may be armbands that secure a smartphone to a user's arm or other appendage).

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A watch band comprising:
   a proximal end configured to be coupled to a watch body;
   a distal end portion connected to the proximal end by an extension portion;
   an optical sensor disposed within the distal end portion; and
   an electrical path from the optical sensor to the proximal end, wherein the watch band is configured to transfer data from the optical sensor through the electrical path, wherein the optical sensor is configured to send image data to the watch body, and wherein the extension portion is flexible.

2. The watch band of claim 1, wherein the optical sensor is housed within a rigid housing, and wherein the rigid housing is connected to the watch band by a rotatable hinge with an axis of rotation extending in a length direction relative to the watch band.

3. The watch band of claim 1, wherein the optical sensor is a first optical sensor, the watch band further comprising a second optical sensor disposed within the distal end portion, wherein the first optical sensor and the second optical sensor have opposing optical directions.

4. The watch band of claim 1, wherein the extension portion is malleable.

5. The watch band of claim 1, wherein the watch band comprises a core comprising at least one of malleable metal and magnetorhelogical fluid.

6. The watch band of claim 1, wherein the optical sensor captures an image in response to a user pinching the watch band.

7. The watch band of claim 1, wherein the optical sensor captures an image in response to verbal input.

8. The watch band of claim 1, wherein the watch band is configured to transfer data from the optical sensor through a wireless connection.

9. The watch band of claim 1, wherein the distal end portion comprises a battery and a processor in electrical communication with the optical sensor.

10. A wearable device comprising:
the watch band of claim 1; and
the watch body comprising a display,
wherein the proximal end is attached to the watch body, and
wherein the distal end portion is movable relative to the watch body when the wearable device is secured around a user's appendage.

11. The wearable device of claim 10, wherein the display displays in real time images sensed by the optical sensor, and wherein the display begins displaying the images in response to the distal end portion being manipulated by a user.

12. The watch band of claim 10, wherein the distal end portion is configured to be removably mounted to the watch body, at a side of the watch body that is opposite the proximal end.

13. The watch band of claim 12, wherein when the distal end portion is mounted to the watch body, the distal end portion is rigidly mounted in a fixed position relative to the watch body.

14. The wearable device of claim 10, further comprising:
a rigid housing forming the distal end portion, wherein the optical sensor is housed within the rigid housing, and wherein the rigid housing is connected to the extension portion by a rotatable hinge with an axis of rotation extending in a length direction relative to the watch band;
a battery disposed within the rigid housing and in electrical communication with the optical sensor, and
a processor disposed within the rigid housing and in electrical communication with the optical sensor and the battery;
wherein the electrical path extends from at least one of the optical sensor, the battery, and the processor to the watch body, for transferring data therebetween;
wherein the extension portion is malleable, and
wherein the rigid housing is configured to be removably mounted to the watch body.

15. A wearable device comprising:
a watch body comprising a display;
a watch band coupled to at least one side of the watch body, wherein the watch band is configured to secure the wearable device around a user's appendage, the watch band comprising an extension portion and a distal end portion, the distal end portion being coupled to the extension portion by a hinge having an axis of rotation that is parallel to a direction of extension of the extension portion at an interface with the distal end portion; and
an optical sensor disposed at the distal end portion of the watch band, wherein the display is configured to show an image captured by the optical sensor.

16. The watch band of claim 15, wherein the watch band is coupled to the watch body at a proximal end of the watch band and at an intermediate position of the watch band, wherein the intermediate position is disposed between the proximal end and the distal end portion.

17. The watch band of claim 16, wherein the distal end portion is connected to the intermediate position by e extension portion, and wherein the extension portion is flexible.

18. The watch band of claim 17, wherein the extension portion can be manipulated into a shape and will maintain that shape in the absence of further manipulation.

19. A watch band comprising:
a distal end portion; and
an extension portion coupled to the distal end portion; and
an optical sensor coupled to the distal end portion and configured to capture an image based on an orientation of the distal end portion relative to the extension portion, wherein the distal end portion is rotatable relative to the extension portion by at least 180 degrees, and the distal end portion is coupled to the extension portion by a hinge having an axis of rotation that is parallel to a direction of extension of the extension portion at its interface with the distal end portion.

20. The watch band of claim 19, further comprising an additional optical sensor coupled to the distal end portion, wherein the optical sensor and the additional optical sensor face in opposite directions.

* * * * *

UNITED STATES PATENT AND TRADEMARK OFFICE
CERTIFICATE OF CORRECTION

PATENT NO. : 10,331,083 B1  
APPLICATION NO. : 15/268531  
DATED : June 25, 2019  
INVENTOR(S) : Trevor J. Ness et al.

Page 1 of 1

It is certified that error appears in the above-identified patent and that said Letters Patent is hereby corrected as shown below:

In the Claims

Column 12, Line 34 (Claim 17): "e" should read --the--.

Signed and Sealed this  
Third Day of September, 2019

Andrei Iancu  
*Director of the United States Patent and Trademark Office*